United States Patent
Sun

(10) Patent No.: US 11,476,940 B2
(45) Date of Patent: Oct. 18, 2022

(54) OPTICAL TRANSCEIVER AND SIGNAL PROCESSING METHOD THEREOF

(71) Applicant: JESS-LINK PRODUCTS CO., LTD., New Taipei (TW)

(72) Inventor: Chi-Hsien Sun, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 0 days.

(21) Appl. No.: 17/082,565

(22) Filed: Oct. 28, 2020

(65) Prior Publication Data

US 2022/0069912 A1   Mar. 3, 2022

(30) Foreign Application Priority Data

Aug. 26, 2020   (TW) .................................. 109129101

(51) Int. Cl.
*H04B 10/00* (2013.01)
*H04B 10/40* (2013.01)
*G02B 6/42* (2006.01)

(52) U.S. Cl.
CPC .......... *H04B 10/40* (2013.01); *G02B 6/4246* (2013.01); *G02B 6/4292* (2013.01)

(58) Field of Classification Search
CPC .... H04B 10/40; H04B 10/60; H04B 10/0731; G02B 6/4246
See application file for complete search history.

(56) References Cited

U.S. PATENT DOCUMENTS

| 8,886,840 B2 | 11/2014 | Fujimori et al. | |
| 2005/0111845 A1* | 5/2005 | Nelson | H04B 10/672 398/138 |
| 2005/0169585 A1* | 8/2005 | Aronson | H04B 10/40 385/89 |
| 2006/0268969 A1* | 11/2006 | Kimura | H03G 3/3084 375/225 |

(Continued)

OTHER PUBLICATIONS

Office Action dated Jul. 30, 2021 of the corresponding Taiwan patent application No. 109129101.

*Primary Examiner* — Pranesh K Barua
(74) *Attorney, Agent, or Firm* — Chung-Ming Shih; HDLS IPR Services

(57) ABSTRACT

A signal processing method of an optical transceiver is provided and has the steps of: providing a receiver optical subassembly, a transmitter optical subassembly, an amplifying module and an identifying module, the amplifying module is electrically connected to the receiver optical subassembly and the transmitter optical subassembly, the identifying module is electrically connected to the receiver optical subassembly and the amplifying module; receiving an input optical signal via the receiver optical subassembly; periodically detecting the input optical signal by the identifying module to identify, setting the amplifier module at a high-speed mode if a clock and data recovery signal is attached, amplifying the input optical signal to generate an output optical signal and outputting through the transmitter optical subassembly; setting the signal amplifier module at a low-speed mode, and amplifying the input optical signal to generate an output optical signal and outputting through the transmitter optical subassembly.

10 Claims, 2 Drawing Sheets

(56) References Cited

U.S. PATENT DOCUMENTS

| | | | |
|---|---|---|---|
| 2009/0148155 A1* | 6/2009 | Latchman | H04B 10/697 398/2 |
| 2010/0119240 A1* | 5/2010 | Feng | H04B 10/69 398/202 |
| 2011/0222866 A1* | 9/2011 | Mashimo | H04L 25/0262 398/202 |
| 2012/0008954 A1* | 1/2012 | Tanaka | H04L 7/033 398/67 |
| 2015/0200726 A1 | 7/2015 | Tang et al. | |
| 2018/0006799 A1* | 1/2018 | Yadav | H04B 10/616 |
| 2019/0081699 A1 | 3/2019 | Tang et al. | |

* cited by examiner

OPTICAL TRANSCEIVER AND SIGNAL PROCESSING METHOD THEREOF

BACKGROUND OF THE INVENTION

1. Technical Field

The technical field of this disclosure relates to an optical transceiver, and more particularly to the optical transceiver capable of passively switching a signal transmission speed and signal processing method thereof.

2. Description of Related Art

In a conventional optical transceiver, data transmitted at high speed are usually received asynchronously by a receiving end and distorted by noise interference, so that a clock and data recovery circuit is required in the receiving end to extract clock information from the data and use this information to extract the inputted data again in order to reduce the error rate.

Therefore, a high-speed data signal of a conventional optical-fiber communication system is often attached with a clock and data recovery (CDR) signal provided for correcting errors. When connecting a circuit, an operator needs to pre-set a corresponding signal processing method (or pin assignment) by inputting an instruction through Pins (RS0, RS1) according to the speed of a signal (either high speed or low speed). However, the active manual switching operation is inconvenient, and errors are inevitable in such manual operation.

In another conventional passive switching method, data rate is detected to determine a signal transmission speed before switching the speed, but the data rate may be affected by the equipment or may not be maintained within an ideal predetermined range, and thus it is easy to misjudge the signal transmission speed. Furthermore, the data rate must be measured continuously, which increases the workload of a system.

In view of the aforementioned drawbacks of the prior art, the discloser of the present disclosure based on years of experience in the related industry to conduct extensive research and experiment, and finally provided a feasible solution to overcome the drawbacks of the prior art.

SUMMARY OF THE INVENTION

It is a primary object of this disclosure to overcome the drawbacks of the prior art by providing an optical transceiver capable of passively switching a signal transmission speed and its signal processing method.

To achieve the aforementioned and other objectives, the present disclosure discloses a signal processing method of an optical transceiver, comprising the steps of: providing an optical transceiver comprising a receiver optical subassembly, a transmitter optical subassembly, an amplifying module and an identifying module, wherein the amplifying module is electrically coupled to the receiver optical subassembly and the transmitter optical subassembly, and the identifying module is electrically coupled to the receiver optical subassembly and the amplifying module; receiving an input optical signal via the receiver optical subassembly; periodically detecting the input optical signal to identify whether or not the input optical signal contains a clock and data recovery signal by the identifying module, wherein if the identifying module detected the clock and data recovery signal, the identifying module drives the amplifying module to be set to a high-speed mode, and the amplifying module amplifies the input optical signal to generate an output optical signal, the transmitter optical subassembly outputs the output optical signal, and if the identifying module does not detected the clock and data recovery signal, the identifying module drives the amplifying module to be set to a low-speed mode, and the amplifying module amplifies the input optical signal to generate an output optical signal, the transmitter optical subassembly outputs the output signal.

In the signal processing method of the optical transceiver of this disclosure, the amplifying module converts the input optical signal into an electrical signal, and the amplifying module amplifies the electrical signal and converts the electrical signal into the output optical signal.

In the signal processing method of the optical transceiver of this disclosure, if the identifying module continuously detected the clock and data recovery signal, the identifying module drives the amplifying module to be set to a high-speed mode, and the amplifying module amplifies the input optical signal to generate an output optical signal, the transmitter optical subassembly outputs the output optical signal. If the amplifying module is set to the high-speed mode, the amplifying module locks the clock and data recovery signal. The amplifying module converts the input optical signal into an electrical signal, and the amplifying module locks the clock and data recovery signal, the electrical signal is corrected according the clock and data recovery signal. The amplifying module locks the clock and data recovery signal, the identifying module stops detecting the input optical signal.

The signal processing method of the optical transceiver in accordance with this disclosure further comprises the step of setting the amplifying module to the low-speed mode if the amplifying module fails to lock the clock and data recovery signal. If the amplifying module fails to lock the clock and data recovery signal continuously, the identifying module drives the amplifying module to be set to the low-speed mode, and the amplifying module amplifies the input optical signal to generate an output optical signal, the transmitter optical subassembly outputs the output optical signal.

In the signal processing method of an optical transceiver of this disclosure, if the clock and data recovery signal is undetected continuously, the identifying module drives the amplifying module to be set to the low-speed mode, and the amplifying module amplifies the input optical signal to generate an output optical signal, the transmitter optical subassembly outputs the output optical signal. If the amplifying module is set to the low-speed mode, the identifying module continues to periodically detect the input optical signal to identify whether or not the input optical signal contains the clock and data recovery signal.

This disclosure also provides an optical transceiver for amplifying and converting an input optical signal to output an output optical signal. The optical transceiver comprises a receiver optical subassembly, a transmitter optical subassembly, an amplifying module and an identifying module. The receiver optical subassembly is provided for receiving the input optical signal. The amplifying module is electrically coupled to the receiver optical subassembly for amplifying the input optical signal and converting the input optical signal into the output optical signal. The transmitter optical subassembly is electrically coupled to the amplifying module for outputting the output optical signal. The identifying module is electrically coupled to the receiver optical subassembly and the amplifying module for identifying whether or not the input optical signal contains a clock and data recovery signal and driving the amplifying module to be set to a high-speed mode.

In the optical transceiver of this disclosure, the amplifying module and the identifying module are laid in a same circuit.

The optical transceiver of this disclosure further comprises a circuit board, a receiver optical subassembly, a transmitter optical subassembly and an amplifying module disposed on one surface of the circuit board, and an identifying module disposed on the other surface of circuit board.

In the optical transceiver and its signal processing method in accordance with this disclosure, the identifying module is used to identify the clock and data recovery signal attached to the input optical signal and to distinguish whether the input optical signal is a high-speed signal or a low-speed signal, so as to select a corresponding processing mode. In the method of passively switching the signal transmission speed, the signal transmission speed is driven by the input optical signal, so that it is not necessary to manually and actively set the corresponding signal transmission speed in advance. This disclosure facilitates operations and avoids manual setting errors without requiring a substantial change of the existing structure of the optical transceiver.

DESCRIPTION OF THE PREFERRED EMBODIMENTS

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
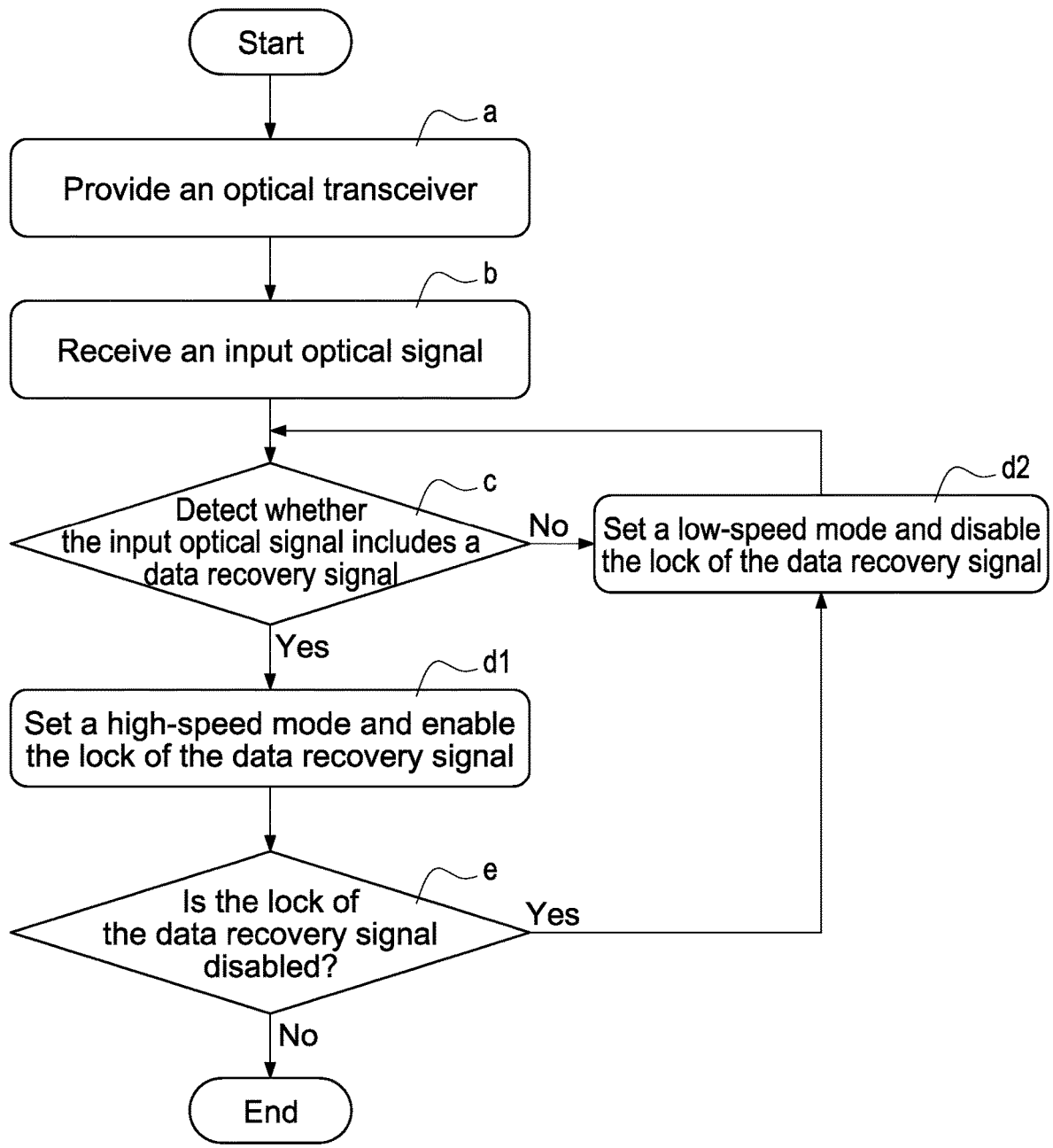
FIG. 1 is a flow chart of a signal processing method of an optical transceiver in accordance with an embodiment of this disclosure.
Figure 2:
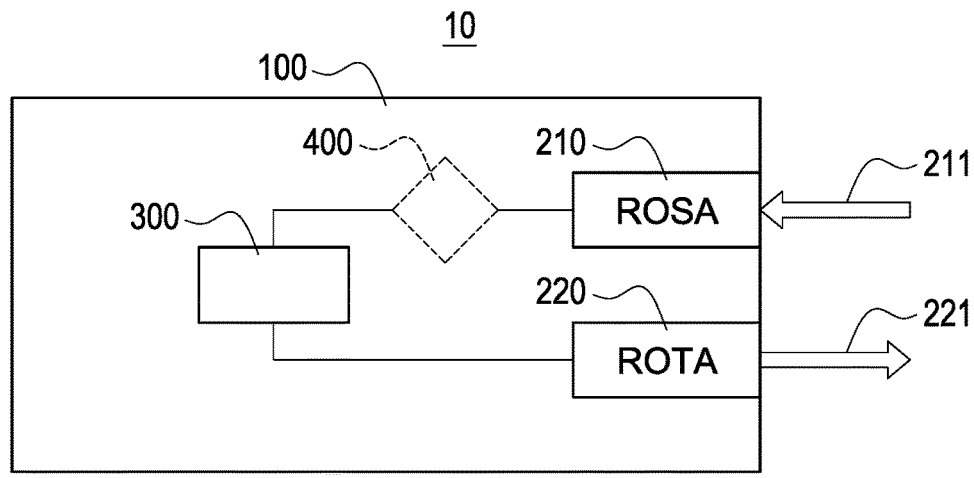
FIG. 2 is a schematic view of an optical transceiver in accordance with an embodiment of this disclosure.
Figure 3:
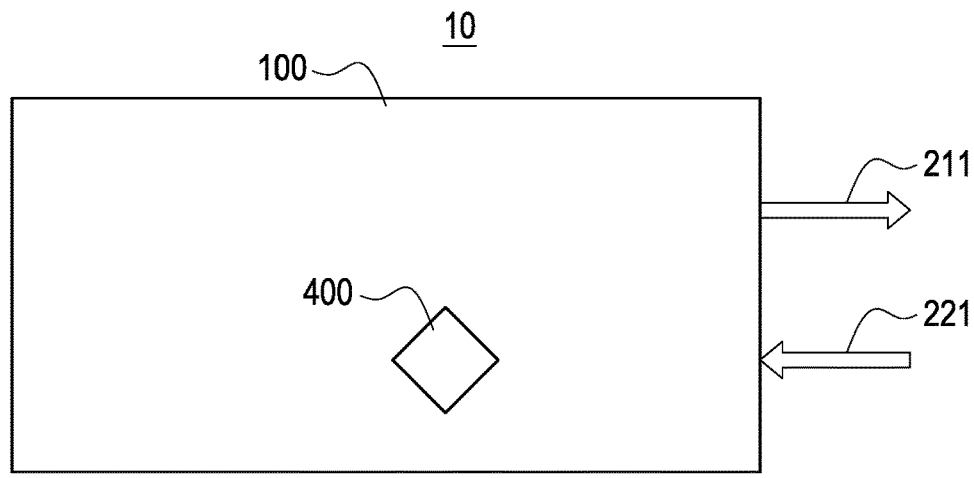
FIG. 3 is another schematic view of an optical transceiver in accordance with an embodiment of this disclosure.

With reference to FIGS. 1 to 3 for an optical transceiver 10 capable of passively switching a signal transmission speed in accordance with an embodiment of this disclosure and a signal processing method thereof. The steps of the signal processing method of the optical transceiver of this disclosure will be described in details below.

Figure 4:
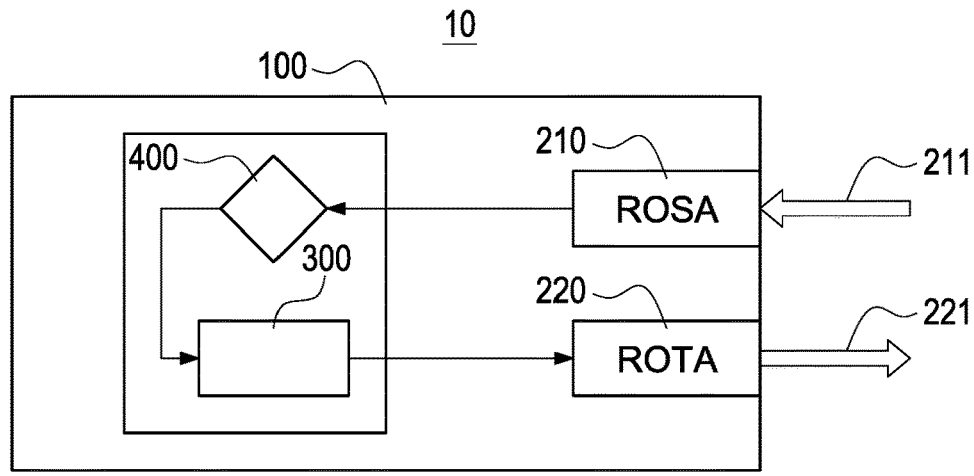
FIG. 4 is a schematic view of an optical transceiver of another implementation mode in accordance with an embodiment of this disclosure.

In a Step (a), an optical transceiver 10 is provided. In this embodiment, the optical transceiver 10 is used for amplifying an input optical signal, converting the input optical signal into an output optical signal, and outputting the output optical signal. The optical transceiver 10 of this disclosure comprises a receiver optical subassembly (ROSA) 210, a transmitter optical subassembly (TOSA) 220, an amplifying module 300 and an identifying module 400. In an embodiment, the optical transceiver 10 further includes a circuit board 100 provided for installing the receiver optical subassembly 210, the amplifying module 300 and the identifying module 400. In this embodiment, the receiver optical subassembly 210, the transmitter optical subassembly 220 and the amplifying module 300 are installed on one surface of the circuit board 100, and the identifying module 400 is installed on the other surface of circuit board 100. However, the amplifying module 300 and the identifying module 400 may be laid in circuits of a same chip as shown in FIG. 4.

The receiver optical subassembly 210 is disposed at a side edge of the circuit board 100 and engaged with a receiver optical cable 211 for receiving the input optical signal transmitted by the receiver optical cable 211.

In an embodiment, the amplifying module 300 is a driver IC. Specifically, the amplifying module 300 is electrically coupled to the receiver optical subassembly 210 and provided for amplifying the input optical signal and converting the input optical signal into an output optical signal.

The transmitter optical subassembly 220 and the receiver optical subassembly 210 are disposed at a same side edge of the circuit board 100, and the transmitter optical subassembly 220 is electrically coupled to the amplifying module 300 and provided for outputting the output optical signal. The transmitter optical subassembly 220 is engaged with a transmitter optical cable 221 for outputting the output optical signal to the transmitter optical cable 221. In addition, the wiring directions of the transmitter optical subassembly 220 and the receiver optical subassembly 210 are preferably parallel to each other.

In this embodiment, the identifying module 400 is preferably a microcontroller unit (MCU). Specifically, the identifying module 400 is electrically coupled to the receiver optical subassembly 210 and the amplifying module 300. The identifying module 400 can identify whether or not the input optical signal received by the receiver optical subassembly 210 contains a clock and data recovery signal (CDR signal).

In a Step (b) performed after the Step (a), the input optical signal is received by the receiver optical subassembly 210. Specifically, the input optical signal is received by the receiver optical cable 211 engaged with the receiver optical subassembly 210.

In a Step (c) performed after the Step (b), the identifying module 400 periodically detects the input optical signal to identify whether or not the input optical signal contains a clock and data recovery signal. If the identifying module 400 has detected the clock and data recovery signal, then the following Step (d1) will be executed. If the identifying module 400 has not detected any clock and data recovery signal, then the following Step (d2) will be executed.

In the Step (c), if the identifying module 400 has detected the clock and data recovery signal, the Step (d1) will be executed, and the identifying module 400 is used to drive the amplifying module 300 to be set to a high-speed mode. In this embodiment, the identifying module 400 preferably continues to detect the clock and data recovery signal for at least two times before driving the amplifying module 300 to be set to the high-speed mode in order to avoid misjudgments. In the high-speed mode, the amplifying module 300 locks the clock and data recovery signal. In the Step (d1), after the amplifying module 300 has locked the clock and data recovery signal, the input optical signal can be corrected according to the clock and data recovery signal, and then the amplifying module 300 amplifies the corrected input optical signal to generate an output optical signal, and finally the transmitter optical subassembly 220 outputs the output optical signal. Specifically, in the Step (d1), the amplifying module 300 converts the input optical signal into an electrical signal first, and then the amplifying module 300 corrects the electrical signal according to the clock and data recovery signal and amplifies the corrected electrical signal and converts the corrected electrical signal into an output optical signal. In addition, after the amplifying module 300 is set to the high-speed mode, the identifying module 400 will stop working.

If the identifying module 400 has not detected any clock and data recovery signal in the Step (c), then the identifying module 400 will drive the amplifying module 300 to be set to a low-speed mode in the Step (d2). In this embodiment, the definition of the detected clock and data recovery signal is preferably based on at least two consecutive detected clock and data recovery signals in order to avoid misjudgments. In the low-speed mode, the amplifying module 300 fails to lock the clock and data recovery signal. In the Step (d2), the amplifying module 300 directly amplifies the received input optical signal to generate an output optical signal, and then the transmitter optical subassembly 220 outputs the output optical signal. In addition, if the amplifying module 300 is set to the low-speed mode, the identifying module 400 will continue to periodically detect the input optical signal and identify whether or not the input optical signal contains the clock and data recovery signal.

In general, an input optical signal of a low speed (such as 10 Gbps) does not contain a clock and data recovery signal, but an input optical signal of a high speed (such as 25 Gbps or above) contains a clock and data recovery signal. Therefore, the input optical signals of different speeds require different processing methods to amplify the signals. The low-speed input optical signal may be amplified without requiring a correction, but the high-speed input optical signal requires the corrections according to the clock and data recovery signal before the signal is amplified.

The identifying module 400 may determine the transmission speed of the input optical signal by the clock and data recovery signal. If the input optical signal contains the clock and data recovery signal, then the identifying module 400 will drive the amplifying module 300 to be set to the high-speed mode. Therefore, the method of using the existence of clock and data recovery signal as a basis for determining the transmission speed of the input optical signal has no intermediate fuzzy situation, and thus the method is very reliable and easy to determine.

The optical transceiver 10 and its processing method in accordance with this disclosure further comprises a Step (e) performed after the Step (d1). In the Step (e), if the amplifying module 300 is set to the high-speed mode and the amplifying module 300 fails to lock the clock and data recovery signal, then the amplifying module 300 will be set to the low-speed mode. In this embodiment, the amplifying module 300 preferably has at least two consecutive times of failing to lock the clock and data recovery signal before the amplifying module 300 is set to the low-speed mode in order to avoid misjudgments.

Specifically, an unplugging of the receiver optical cable 211 may cause a failure of locking the clock and data recovery signal. When the receiver optical cable 211 has not been unplugged, but other parts of the equipment may be changed to lead to a change of the transmission speed of the input optical signal in the same receiver optical cable 211 and results in a failure of locking the clock and data recovery signal. Therefore, using the condition of locking/not locking the clock and data recovery signal (or pattern lock/lock fail) as a basis for the identifying module 400 to restart and detect the clock and data recovery signal, it does not have any intermediate fuzzy situation, and thus the method is very reliable and easy to determine.

In the optical transceiver and its signal processing method in accordance with this disclosure, the identifying module 400 is used to identify whether or not the clock and data recovery signal is attached to the input optical signal and to distinguish whether or not the input optical signal is a high-speed signal or a low-speed signal, so as to select a corresponding processing mode. In the method of passively switching the signal transmission speed, the signal transmission speed is driven by the input optical signal, so that it is not necessary to set a corresponding signal transmission speed manually and actively in advance. This disclosure facilitates operators to change circuits and provides a stable identification basis to avoid setting errors. In addition, the identifying module can be installed on the other side of the circuit board 100 of the conventional optical transceiver 10 opposite to the amplifying module 3000 without requiring a substantial change of the existing structure of the optical transceiver.

While this disclosure has been described by means of specific embodiments, numerous modifications and variations could be made thereto by those skilled in the art without departing from the scope and spirit of this disclosure set forth in the claims.

What is claimed is:

1. A signal processing method of an optical transceiver, comprising the steps of:
   (a) providing an optical transceiver comprising a receiver optical subassembly, a transmitter optical subassembly, an amplifying module and an identifying module, wherein the amplifying module is respectively and electrically coupled to the receiver optical subassembly and the transmitter optical subassembly, and the identifying module is respectively and electrically coupled to the receiver optical subassembly and the amplifying module;
   (b) receiving an input optical signal via the receiver optical subassembly;
   (c) detecting periodically the input optical signal to identify whether or not the input optical signal includes a clock and data recovery signal by the identifying module, wherein if the identifying module detected the clock and data recovery signal for at least two times, a step (d1) is executed, and if the identifying module does not detect the clock and data recovery signal for at least two times, a step d2 is executed;
   (d1) setting the amplifying module to a high-speed mode with the identifying module, amplifying the input optical signal to an output optical signal with the amplifying module and outputting the output optical signal via the transmitter optical subassembly; and
   (d2) setting the amplifying module to a low-speed mode with the identifying module, amplifying the input optical signal to an output optical signal with the amplifying module and outputting the output optical signal via the transmitter optical subassembly.

2. The signal processing method in claim 1, wherein the receiver optical subassembly converts the input optical signal into an electrical signal, and the amplifying module amplifies the electrical signal and the transmitter optical subassembly converts the electrical signal into the output optical signal.

3. The signal processing method in claim 1, wherein if the identifying module continuously detects the clock and data recovery signal, the step (d1) is executed.

4. The signal processing method in claim 1, wherein in the step (d1), if the amplifying module is set to the high-speed mode, the amplifying module locks the clock and data recovery signal, and the receiver optical subassembly converts the input optical signal into an electrical signal, and the amplifying module locks the clock and data recovery signal and corrects the electrical signal according to the clock and data recovery signal.

5. The signal processing method in claim 4, wherein in the step (d1), the amplifying module locked the clock and data recovery signal and the identifying module stops detecting the input optical signal.

6. The signal processing method in claim 4, further comprising: a step (e) following the step (d1), wherein in the step (e), the amplifying module continuously fails to lock the clock and data recovery signal, the step (d2) is executed.

7. The signal processing method in claim 3, wherein in the step (d1), if the amplifying module is set to the high-speed mode, the amplifying module locks the clock and data recovery signal, and the receiver optical subassembly converts the input optical signal into an electrical signal, and the amplifying module locks the clock and data recovery signal and corrects the electrical signal according to the clock and data recovery signal.

8. The signal processing method in claim 7, wherein in the step (d1), the amplifying module locked the clock and data recovery signal and the identifying module stops detecting the input optical signal.

9. The signal processing method in claim 7, further comprising: a step (e) following the step (d1), wherein in the step (e), the amplifying module continuously fails to lock the clock and data recovery signal, the step (d2) is executed.

10. The signal processing method in claim 1, wherein in the step (c), if the clock and data recovery signal is undetected continuously, the step (d2) is executed, and if the amplifying module is set to the low-speed mode in the step (d2), the identifying module continues to periodically detect the input optical signal to identify whether or not the input optical signal comprises the clock and data recovery signal.

* * * * *